United States Patent [19]

Iwai et al.

[11] Patent Number: 4,869,863

[45] Date of Patent: Sep. 26, 1989

[54] METHOD OF AND APPARATUS FOR TUBULARLY DRAWING THERMOPLASTIC RESIN

[75] Inventors: Teruyuki Iwai; Masao Takashige; Hidenobu Takeichi; Yasuo Takai; Yoshinori Sasaki, all of Himeji, Japan

[73] Assignee: Idemitsu Petrochemical Co., Ltd., Tokyo, Japan

[21] Appl. No.: 238,922

[22] Filed: Aug. 31, 1988

[30] Foreign Application Priority Data

Sep. 11, 1987 [JP] Japan .................. 62-227786

[51] Int. Cl.⁴ .......................... B29C 55/28
[52] U.S. Cl. ..................... 264/564; 264/146; 264/150; 264/290.2; 425/294; 425/302.1; 425/316; 425/326.1; 425/387.1
[58] Field of Search ............ 264/150, 563-569, 264/290.2, 145-147; 425/326.1, 387.1, 313-316, 294, 302.1, 296, 305.1, 297

[56] References Cited

U.S. PATENT DOCUMENTS

| 2,779,973 | 2/1957 | Holdaway et al. | 264/146 |
|---|---|---|---|
| 2,862,234 | 12/1958 | Gerber | 264/567 |
| 3,482,280 | 12/1969 | Ronden | 425/327 |
| 3,608,019 | 9/1971 | Sato et al. | 425/326.1 |
| 4,290,996 | 9/1981 | Hayashi et al. | 425/387.1 |
| 4,331,624 | 5/1982 | Yazawa et al. | 264/290.2 |
| 4,434,128 | 2/1984 | Okada et al. | 264/290.2 |
| 4,462,779 | 7/1984 | Brinkmeier et al. | 264/567 |

FOREIGN PATENT DOCUMENTS

| 43-25838 | 11/1968 | Japan | 264/290.2 |
|---|---|---|---|
| 52-16582 | 2/1977 | Japan | 264/567 |
| 52-10155 | 3/1977 | Japan | 264/567 |
| 55-150326 | 11/1980 | Japan | 425/326.1 |

Primary Examiner—Jeffery Thurlow
Attorney, Agent, or Firm—Flynn, Thiel, Boutell & Tanis

[57] ABSTRACT

The present invention relates to a method and an apparatus for tubularly drawing a tubular raw material of thermoplastic resin. Gas for forming a bubble to heatingly draw the tubular raw material is injected into the raw material from a direction opposite to a direction for transferring the raw material through a nozzle. The raw material is cut into a plurality of web-like pieces by cutting blades provided on pinch rolls for taking up the raw material. One of the web-like pieces thus cut is separated from the others and formed with an opening into which the nozzle is inserted to inject the gas.

10 Claims, 4 Drawing Sheets

METHOD OF AND APPARATUS FOR TUBULARLY DRAWING THERMOPLASTIC RESIN

BACKGROUND OF THE INVENTION

1. Field of the Invention

The present invention relates to a method of and an apparatus for two-way drawing a tubular raw material of thermoplastic resin by a tubular method, and more particularly to improvements in a method of and an apparatus for injecting gas into the tubular raw material.

2. Description of the Related Art

Heretofore, there has been known a method of treating a tubular raw material of thermoplastic resin by a tubular method wherein the tubular raw material is threaded through spaces formed between respective pairs of first pinch rolls and second pinch rolls, and gas is sealed in the tubular raw material which is then heatingly two-way drawn, to thereby produce a film.

As a conventional technique wherein gas is injected into the tubular raw material, there has been known a technique wherein the tubular raw material is cut into linear shapes by a fixed cutter immovably provided at the downstream side of the second pinch rolls in such a manner as to be retractable, and this portion thus cut is spread and inserted thereinto with a nozzle to thereby inject air into the raw material (Japanese Patent Examined Publication No. 59-8341: a conventional example (1). As another conventional technique, there has been known a technique wherein a tubular raw material is threaded through spaces formed between first pinch rolls, second pinch rolls and third pinch rolls having a gap of 1–10 mm therebetween or third pinch rolls each having a multiplicity of grooves in the circumferential direction thereof, and gas is injected into the tubular raw material through an end portion thereof (Japanese Patent Examined Publication No. 57-21450: a conventional example (2).

However, out of the above-described conventional techniques, in the conventional example 1, since the tubular raw material is cut into linear shapes with a single blade, a thick raw material cannot necessarily be cut sufficiently, so that the gas cannot necessarily be injected into the raw material reliably. In addition, the portion thus cut should be spread and the nozzle should be inserted thereinto, whereby there have been presented such disadvantages that insertion of the nozzle into the raw material is not easily effected, workability is low and the size of the nozzle to be inserted is restricted, so that this technique is unsuitable for use in a tubular drawing apparatus which is large-sized, has a large diameter and is operated at a high speed. Further, since the cut portion of the raw material is spread, cracks and wrinkles occur in the raw material in the direction of the longitudinal drawing thereof, thus presenting the disadvantage of that smooth cutting of the raw material with the fixed cutter cannot be effected. In the conventional example 2, since the gas is injected into the raw material being transferred through one end portion thereof, although the tubular raw material can be spread in a small-sized apparatus, the workability is low, a sufficient amount of the gas required for expanding the raw material cannot be injected sufficiently in a large-sized apparatus, thereby presenting the disadvantages of that the workability becomes low and the technique cannot be practicized.

SUMMARY OF THE INVENTION

An object of the present invention is to provide a method of and an apparatus for tubularly drawing a raw material of thermoplastic resin, wherein gas can be reliably injected into a tubular raw material, workability during injection is satisfactory and the size of the tubular raw material to be applicable is not restricted.

The method according to the present invention features that, in a method of tubularly drawing a raw material of thermoplastic resin, wherein a tubular raw material is threaded through spaces formed between respective pairs of first pinch rolls and second pinch rolls, gas is sealed therein, and the tubular raw material is heatingly drawn, the tubular raw material is cut into a plurality of web-like pieces at the downstream side of the second pinch rolls in a direction of transferring the raw material, out of these web-like pieces, one web-like piece is separated from the remaining web-like pieces and an opening is formed therein, the gas is injected through this opening of the raw material to form a bubble of a predetermined diameter, and thereafter, the gas is sealed therein.

The apparatus according to the present invention features that, in an apparatus for tubularly drawing a tubular raw material of thermoplastic resin, wherein the tubular raw material is threaded through spaces formed between respective pairs of first pinch rolls and second pinch rolls, gas is sealed therein and the tubular raw material is heatingly drawn, third pinch rolls are provided with a cutting roll having a plurality of cutting blades, for cutting the tubular raw material delivered from the second pinch rolls into web-like shapes along a direction of transferring the tubular raw material and a nozzle for injecting the gas into the tubular raw material are provided at the downstream side of the second pinch rolls, said nozzle being provided in such a manner as to be able to advance into or retract from the raw material through an opening formed by separating one web-like piece from the remaining web-like pieces, which are cut into a plurality of web-like pieces by the third pinch rolls and said third pinch rolls having a nozzle insertion portion.

With this arrangement, the present invention contemplates in that the tubular raw material threaded through the spaces formed between the pairs of the first pinch rolls and second pinch rolls is cut into web-like shapes with the cutting blades of the third pinch rolls, one web-like piece thus cut into the web-like shape and he remaining ones are separated from each other so as to form an opening of the raw material, the nozzle is advanced into the opening to inject the gas thereinto, and, when the piece is expanded, the piece formed into a bubble shape having a predetermined diameter to be drawn to a satisfactory length, the nozzle is retracted from the piece.

DETAILED DESCRIPTION OF THE PREFERRED EMBODIMENT

One embodiment of the present invention will hereunder be described with reference to the accompanying drawings.

Figure 1:
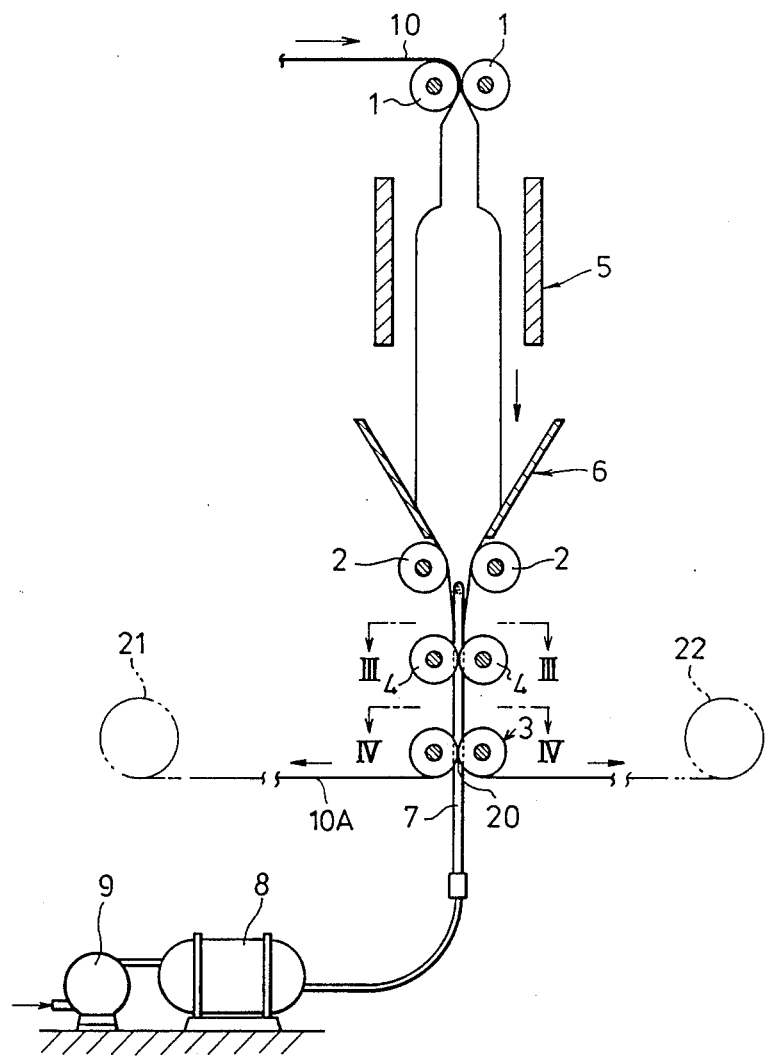
FIG. 1 is a schematic diagram of one embodiment of the apparatus according to the present invention.

Referring to FIG. 1 which shows the schematic arrangement of the apparatus according to the present invention, the respective pairs of first pinch rolls 1 and second pinch rolls 2 are provided in the vertical direction, and a tubular raw material 10 delivered from an extruder, not shown, is threaded through spaces formed by these pinch rolls 1 and 2. This raw material 10 is formed of a single or multi-layer material of thermoplastic resin which is modified by such for example as polypropylene, polyethylene, a copolymer of ethylene-vinyl acetate, polyamide, polyester, a copolymer of ethylene-vinyl alcohol, polyvinylidene chloride resin, or a multi-layer material of thermoplastic resin denaturalized by an unsaturated carboxylic acid or a derivative thereof.

Heating furnace 5 and stabilizing plates 6 having two plates and arranged into a generally V shape are respectively provided between the first and second pinch rolls 1 and 2. In this case, the first pinch rolls 1 are rotated about at the same circumferential speed as the speed at which the raw material is transferred and the second pinch rolls 2 are rotated at a faster circumferential speed than the first pinch rolls 1, so that the raw material 10 can be drawn in the direction of transferring the raw material (longitudinal direction) in cooperation with heating by the heating furnace 5. The raw material 10 is expanded by sealing of air and heating by the heating furnace 5, whereby the raw material 10 can also be drawn in the lateral direction thereof in the bubble shape, so that this raw material 10 can be produced as a film product drawn in the two axes at predetermined magnifications. Incidentally, air is blown to the raw material 10 with air rings, not shown, to stabilize the bubble during the drawing.

The raw material 10 (a film) formed into the bubble shape with the stabilizing plates 6 is gradually flattened, the pinch rolls 2 approach to each other or are retracted from each other to thereby be opened or closed, and the two stabilizing plates 6 approach to each other or are retracted from each other in operational association with the second pinch rolls 2 to thereby be able to adjust a relative distance therebetween.

Figure 2:
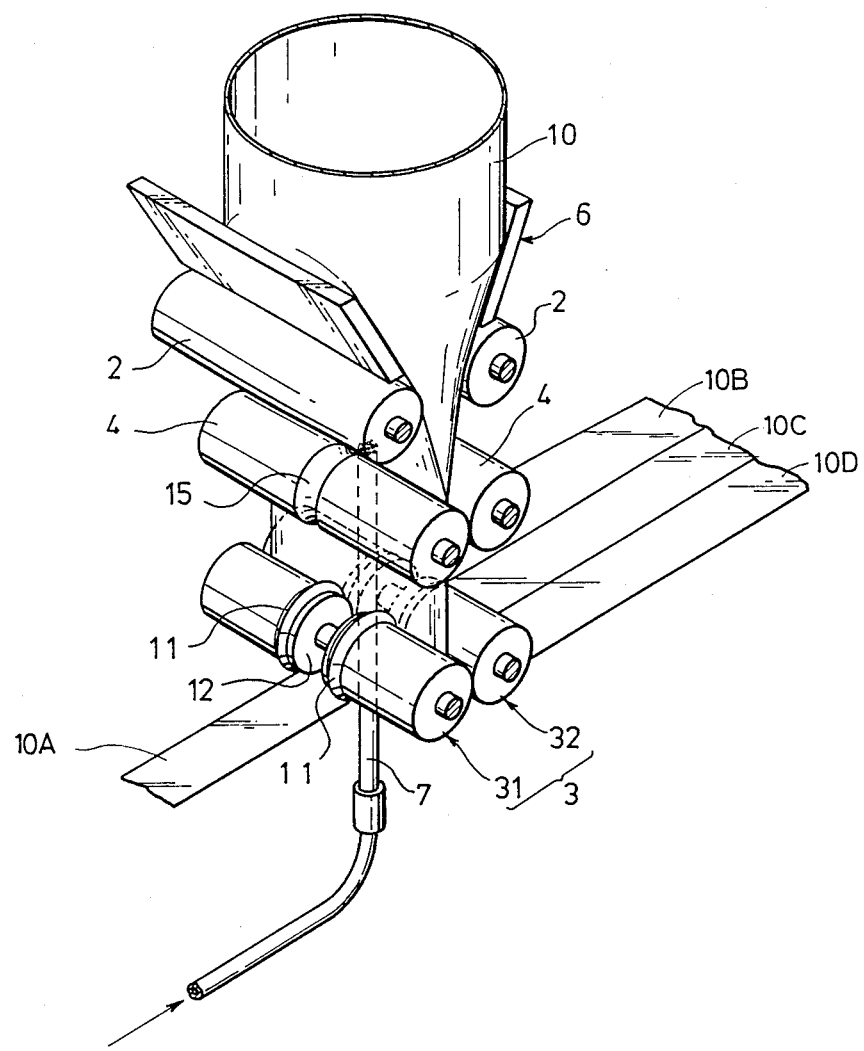
FIG. 2 is a perspective view with the essential portions thereof being enlarged.
Figure 4:
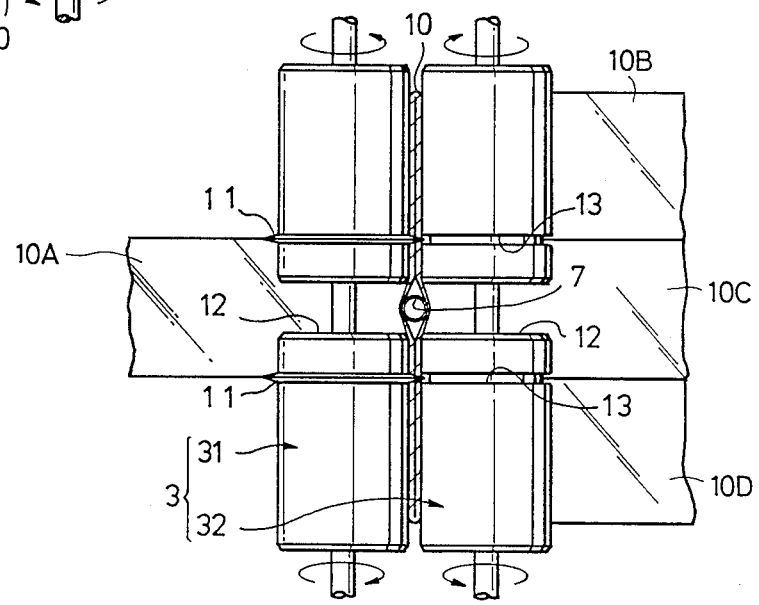
FIG. 4 is a view in the direction indicated by the arrows from the line IV—IV in FIG. 1.

As shown in FIG. 2, provided at the downstream side of the second pinch rolls 2 are third pinch rolls 3 having the same circumferential speed as the second pinch rolls 2. As shown in FIG. 4, the third pinch rolls 3 is constituted by: a cutting roll 31 made of rubber, having two detachable rotary blades 11 and a groove 12 formed on the outer peripheral surface thereof between the rotary blades 11 to form a nozzle insertion portion; and a receiving roll 32 made of metal, having two groove-shaped female blades 13 for receiving of the two rotary blades 11, respectively, and formed with a groove 12 on the outer peripheral surface thereof between the female blades 13 to form a nozzle insertion portion in cooperation with the groove 12 of the cutting roll 31. When the tubular raw material 10 is threaded through a space formed between the rolls 31 and 32, the raw material 10 is cut in a doubled manner along the direction of transferring the raw material 10. Here, the raw material 10 is cut into pieces including a first web-like piece 10A, and a second to fourth web-like pieces 10B, 10C and 10D, respectively. The first web-like piece 10A and the third web-like piece 10C as being single pieces, respectively, are separated from the second web-like piece 10B and the fourth web-like piece 10D as being in doubled state. The first web-like piece 10A after passing through the third pinch rolls 3 is taken up by a drum 21 to the left in FIG. 1, while, the second to fourth web-like pieces 10B–10D are taken up by a drum 22 to the right in FIG. 1, whereby an opening 20 of the raw material is formed at a portion at which the first web-like piece 10A is separated from the remaining web-like pieces 10B–10D.

Figure 3:
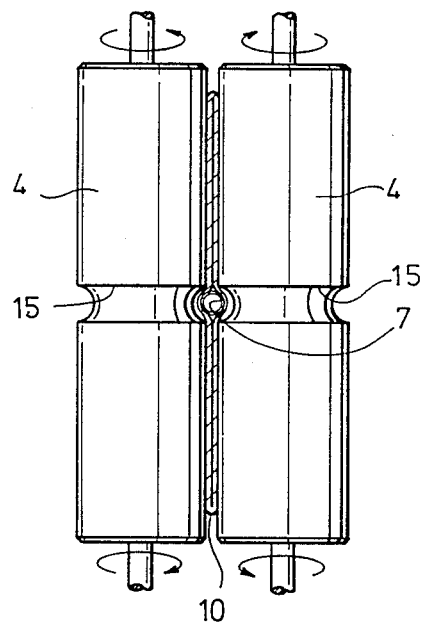
FIG. 3 is a view in the direction indicated by the arrows from the line III—III in FIG. 1.

As shown in FIG. 3, provided between the second pinch rolls 2 and the third pinch rolls 3 are intermediate pinch rolls 4 for taking up the raw material 10 delivered from the second pinch rolls 2 and delivering the same to the third pinch rolls 3, and having the same circumferential speed as the second pinch rolls 2. The intermediate pinch rolls 4 is constituted by a pair of rubber rolls for example, each having a narrowed-down portion 15.

Within the raw material 10, there is provided a rod-shaped nozzle 7 in such a manner as to be able to advance or retract through the groove of the third pinch rolls 3 and the narrowed-down portion 15 of the intermediate rolls 4. As shown in FIG. 1, the nozzle 7 is connected to a tank 8 storing a large amount of compressed gas and a compressor 9, and can advance into the raw material 10 by use of its forward end formed into a tapered shape to thereby inject the gas.

A method of drawing the raw material 10 of thermoplastic resin by use of the apparatus of the above-described arrangement will hereunder be described with reference to FIGS. 5.

Figure 5A:
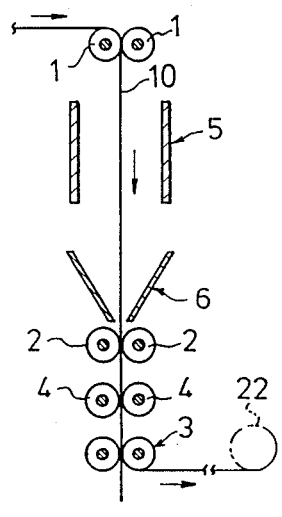
FIGS. 5(A) to 5(D) are views in explanation of the method according to the present invention.
Figure 5B:
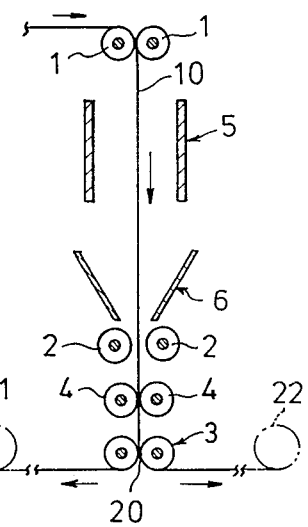

First, as shown in FIG. 5(A), the flat tube-shaped raw material 10 transferred from the extruder, not shown, is successively threaded through the spaces formed by the first pinch rolls 1, second pinch rolls 2, intermediate pinch rolls 4 and third pinch rolls 3 in the order described above, and the raw material 10 delivered from the third pinch rolls 3 is taken up by the drum 22 to the right in the drawings at a predetermined value of tension. In this case, the rotary blades 11 are previously mounted on the cutting roll 31 and the flat-shaped raw material 10 is cut into the web-like shapes in the doubled state while being pressed by the third pinch rolls 3. Thereafter, as shown in FIG. 5(B), one of the web-like raw material 10A in the doubled state, i.e. the web-lie piece 10 is taken up by the other drum 21 at a predetermined value of tension. With this arrangement, the raw material 10 is divided into two including the first web-like piece 10A and the second to fourth web-like pieces 10B–10D, and the opening of the raw material is formed at a position thereof close to the third pinch rolls 3.

Figure 5C:
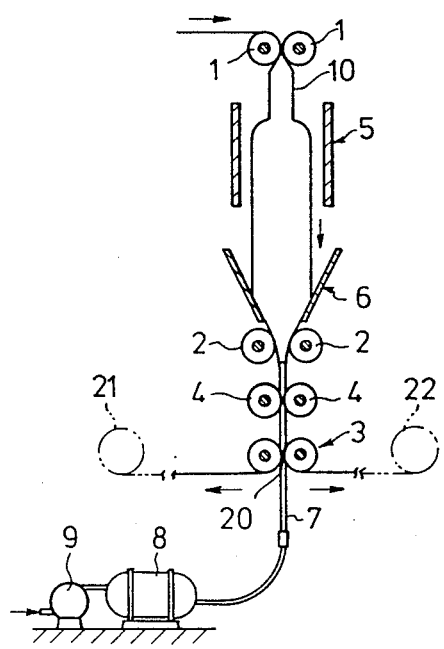
Figure 5D:
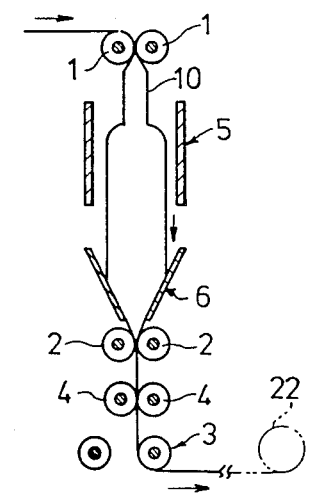

Subsequently, the second pinch rolls 2 are separated from each other to open and the stabilizing plates 6 are spread in operational association with the rolls 2, thereafter, as shown in FIG. 5(C), the nozzle 7 advances into the raw material 10 from the opening 20 of the raw material up to the vicinity of a bottom portion of the second pinch rolls 2, passing through the groove 12 of the third pinch rolls 3 and the narrowed-down portion 15 of the intermediate pinch rolls 4, and the gas is injected into the raw material 10 through the forward end of the nozzle 7 by the tank 8 and the compressor 9. Then, the raw material 10 being heated by the heating furnace 5 is expanded due to the injection of the gas to form the bubble, whereby the raw material 10 is expanded in the lateral direction thereof, and further, due to the difference in circumferential speed between the first pinch rolls 1 and the second pinch rolls 2, the raw material 10 is also drawn in the longitudinal direction thereof. When the diameter of the bubble of the raw material 10 reaches the predetermined value, the second pinch rolls 2 are made to approach to each other to close, the distance between the stabilizing plates 6 is reduced in the distance therebetween in operational association with the rolls 2, thereafter, the nozzle is retracted, and further, the cutting roll 31 is separated from the receiving roll 32 to thereby remove the cutting blades 11. Thereafter, as shown in FIG. 5(D), while drawn in the longitudinal and lateral directions, i.e. in the directions of the two axes in a state where the gas is sealed in the tubular raw material 10 disposed between the first pinch rolls 1 and the second pinch rolls 2, the raw material 10 is taken up by the drum 22 as a film.

According to this embodiment as described above, since the tubular raw material 10 is cut into the web-like shapes with the two rotary blades 11, even a thick wall raw material can be satisfactorily cut, the gas can be reliably injected into the raw material 10, and moreover, the nozzle 7 is advanced into the raw material 10 through the opening 20 of the raw material formed by separating the first web-like piece 10A and the remaining web-like pieces 10B–10D, which are thus cut, and the grooves 12 are provided on the rolls 31 and 32 constituting the third rolls 3. In consequence, mounting of the nozzle into the raw material 10 is facilitated to improve the workability and the size of the nozzle 7 is not restricted. Due to unrestricted size of the nozzle 7, the present invention can be applied to the tubularly drawing apparatus being large-sized and operated at high speed. In other words, according to this embodiment, the size of the tubular raw material 10 to be drawn is not restricted. Moreover, since the tubular raw material 10 is not spread at the cut portion as in the conventional example 1 and the raw material 10 is cut while being pressed by the third pinch rolls 3, no longitudinal cracks and wrinkles occur in the raw material 10. In consequence, unsatisfactory cutting of the raw material 10 due to these cracks and wrinkles and damaged cutting blades can be prevented, thus enabling to avoid lowered safety due to these damages and the like. In this embodiment, the provision of the intermediate rolls 4 between the second and third pinch rolls 2 and 3 makes it possible to secure the sufficient drawing force for drawing the raw material 10 in the longitudinal direction thereof in cooperation with the second and third pinch rolls 2 and 3. Further, when the gas is injected into the raw material 10, not only the second pinch rolls 2 but also stabilizing plates 6 consisting of the two plates can approach to each other and be separated from each other, so that, when these rolls and plates are separated from each other, the gas can be easily injected into the raw material 10, and, when these rolls and plates approach to each other, the raw material (film) can be taken up in the state where the raw material is sufficiently flattened. The groove-shaped female blades 13 are formed on the receiving roll 32 constituting the pair with the cutting roll 31 having the rotary blades 11, so that the tubular raw material 10 can be cut reliably. Further, the forward end portion of the nozzle 7 is tapered, whereby the nozzle 7 can advance smoothly into the tubular raw material 10, so that the workability can be improved.

To ascertain the meritorious effects of this embodiment, an experimental example and comparative examples will hereunder be described.

EXPERIMENTAL EXAMPLE

A tubular raw material 10:

A water-cooled raw material having a thickness of 120 μm and a width (folded width) of 500 mm which is obtained by extruding a raw material of polyamide (nylon) having a relative viscosity 3.75 from an extruder at a melting temperature of 250° C. (Trade name: Ube nylon 1024).

A ratio of speed between the first pinch rolls and the second pinch rolls (a draw ratio in the longitudinal direction): 3

A draw ratio in the lateral direction: 3

Under the above-described conditions, a bubble was formed by injecting air according to the above embodiment, drawing was started and the tubular raw material 10 was drawn. As a result, a drawn film having a width of 1500 mm was produced in one operation without any vibration of the tubular raw material 10.

COMPARATIVE EXAMPLE 1

A raw material similar to the one in the experimental example was used, during the operation of injecting the gas, in the same manner as in the conventional example 1, the tubular raw material 10 was cut into the linear shapes with a fixed cutter, and the nozzle was mounted in the raw material 10. In this case, when an OLFA cutter (trade name) was used as an unrotatable fixed cutter, before the air was injected, i.e. in a state where the tubular raw material 10 was not drawn in the lateral direction (in the widthwise direction), the cutter was able to cut the raw material 10 sufficiently, however, when the width of the raw material 10 was spread along with the injection of the gas, wrinkles easily occurred in the raw material 10 during the drawing, a blade of the OLFA cutter was broken due to the wrinkled raw material 10, and it was impossible to continuously inject the gas into the raw material 10. These drawing operations were repeated several times, however, it was not possible to sufficiently inject the gas into the raw material 10.

COMPARATIVE EXAMPLE 2

A raw material similar to the one in the experimental example is used, the raw material 10 was not cut as in the conventional example 2, and the gas was injected through an end portion of the raw material 10. In this case, the nozzle was inserted from the end portion of the raw material 10 and the gas was injected into the raw material 10 while the nozzle was moving together with the raw material 10. However, it was impossible to obtain the aimed width of the film. Specifically, the width of the raw material 10 was set to 500 mm as in the experimental example, however, the width of the film after the drawing was limited to 1100 mm, and, even when the drawing operations were repeated several times, 1500 mm at which the draw ratio in the lateral direction becomed three times was not achieved.

Incidentally, in the above embodiment, the intermediate pinch rolls 4 were provided between the second and third pinch rolls 2 and 3, however, it is not necessarily required to provide the intermediate pinch rolls 4 according to the present invention. The rotary blades 11 formed on one of the third pinch rolls 3 are not limited to two as in the above embodiment only if the number of the rotary blades is plural. The cut position is not restricted to the one in the above embodiment. Further, the cutting roll of the third pinch rolls 3 is not limited to rubber and the receiving roll 32 is not necessarily formed with the female blade 13. In the above embodiment, the nozzle insertion portion was formed into the groove 12, however, the nozzle insertion portion according to the present invention may be a space or the like between rolls divided into two at a predetermined position between the two rotary blades of the third pinch rolls 3 for example. Namely, any construction can be adopted only if the nozzle 7 can be inserted in a state where the cutting roll 31 and the receiving roll 32 of the third pinch rolls are in close contact with each other. A suitable cover may be provided in the circumferential directions of the rotary blades 11, to thereby avoid a danger.

As has been described hereinabove, the present invention can offer such advantages that the gas can be reliably injected into the tubular raw material, the workabily during the injection is satisfactory and the size of the applicable tubular raw material is not restricted.

What is claimed is:

1. A method of tubularly drawing a tubular raw material of thermoplastic resin, comprising the steps: threading said tubular raw material through spaces formed between respective pairs of first pinch rolls, second pinch rolls and third pinch rolls, cutting said tubular raw material into a plurality of web-like pieces, in a direction of transferring said raw material at a downstream side of said second pinch rolls, out of the web-like pieces, said cutting being performed with cutting means on said third pinch rolls, said cutting means being operable when said third pinch rolls are together and inoperable when they are spaced apart, separating the second pinch rolls from one another, separating one web-like piece from the remaining web-like pieces to define an opening into the interior of said tubular material, inserting a nozzle into said opening and in a direction opposing movement of the tubular material, injecting a gas through said nozzle and said opening in said raw material to form a bubble of a predetermined diameter in the interior of said tubular material, and thereafter, bringing said second pinch rolls together to seal the gas bubble between said first and second pinch rolls, heating the portion of tubular raw material forming said bubble and simultaneously drawing the tubular material by rotating the second pinch rolls faster than the first pinch rolls, and separating said third pinch rolls to terminate said cutting step without unsealing said bubble.

2. The method of tubularly drawing a raw material of thermoplastic resin as set forth in claim 1, wherein said web-like pieces are cut by said cutting means such that first, second, third and fourth web-like pieces are formed and one in the central portion is separated from others.

3. The method of tubularly drawing a tubular raw material of thermoplastic resin as set forth in claim 1, wherein the direction of separating said web-like pieces is generally horizontal and in opposite horizontal directions.

4. An apparatus for tubularly drawing a tubular raw material of thermoplastic resin, comprising: first pinch rolls, second pinch rolls and third pinch rolls oriented to engage said tubular raw material threaded through spaces formed between the pinch rolls, said third pinch rolls being provided with a cutting means having a plurality of cutting blades for cutting said tubular raw material delivered from said second pinch rolls into web-like shapes along a longitudinal direction of said tubular material, means defining an opening on said third pinch rolls adapted to receive therein a nozzle, an axis of said opening extending generally perpendicular to a plane containing axes of said third pinch rolls, a nozzle means for injecting a gas into said tubular material located at a downstream side of said second pinch rolls, said nozzle means including support means for supporting said nozzle means for movement toward and away from said raw material through said opening and a further opening formed by separating one web-like piece from the remaining web-like pieces cut into a plurality of web-like pieces by said cutting means on said third pinch rolls, said third pinch rolls including a pair of rolls, one of said rolls having two cutting blades thereon, said cutting blades being axially spaced apart a predetermined distance from each other, said means defining said opening on said third pinch rolls including a groove portion on each pinch roll of said third pinch rolls, said groove having a predetermined width at an intermediate axial portion thereof, and said support means supporting said nozzle means for movement into and out of said groove portions.

5. The apparatus for tubularly drawing a tubular raw material of thermoplastic resin as set forth in claim 4, wherein another of said rolls of said third pinch rolls not provided with the cutting blades being formed with grooves for receiving said cutting blades therein.

6. The apparatus for tubularly drawing a tubular raw material of thermoplastic resin as set forth in claim 4, wherein said roll having said cutting blades thereon is made of rubber.

7. The apparatus for tubularly drawing a tubular raw material of thermoplastic resin as set forth in claim 4, wherein intermediate pinch rolls are provided between said second and said third pinch rolls.

8. The apparatus for tubularly drawing a tubular raw material of thermoplastic resin as set forth in claim 4, wherein said second pinch rolls are separated from each other at the time said nozzle means is received in said opening.

9. The apparatus for tubularly drawing a tubular raw material of thermoplastic resin as set forth in claim 4, wherein said support means for said nozzle means supports said nozzle means for insertion into said opening in a direction opposite to the direction of movement said raw material.

10. The apparatus for tubularly drawing a tubular raw material of thermoplastic resin as set forth in claim 4, wherein said third pinch rolls are supported for movement toward and away from each other.

* * * * *